(12) United States Patent
Compton et al.

(10) Patent No.: US 11,049,671 B2
(45) Date of Patent: Jun. 29, 2021

(54) POWER DISTRIBUTION SWITCH FOR A POWER DISTRIBUTION SYSTEM

(71) Applicant: GE Aviation Systems Limited, Gloucestershire (GB)

(72) Inventors: Russell Mark Compton, Droitwich Spa (GB); Glenn Scott Claydon, Wynantskill, NY (US); John Oliver Collins, Cheltenham (GB); Christopher Fred Keimel, Niskayuna, NY (US); Julian Peter Mayes, Cheltenham (GB)

(73) Assignee: GE Aviation Systems Limited, Gloucestershire (GB)

( * ) Notice: Subject to any disclaimer, the term of this patent is extended or adjusted under 35 U.S.C. 154(b) by 108 days.

(21) Appl. No.: 15/997,256

(22) Filed: Jun. 4, 2018

(65) Prior Publication Data
US 2019/0019637 A1     Jan. 17, 2019

(30) Foreign Application Priority Data

Jul. 10, 2017 (GB) ..................................... 1711053

(51) Int. Cl.
*H01H 9/54*     (2006.01)
*H02J 3/00*     (2006.01)
(Continued)

(52) U.S. Cl.
CPC ............. *H01H 9/542* (2013.01); *H02J 3/005* (2013.01); *H02J 4/00* (2013.01); *B64D 41/00* (2013.01);
(Continued)

(58) Field of Classification Search
CPC ...... H01H 9/00; H01H 47/00; H01H 59/0009; H01H 59/00; H01H 1/00; H01H 45/00;
(Continued)

(56) References Cited

U.S. PATENT DOCUMENTS 5,943,223 A * 8/1999 Pond ....................... H02M 1/00
                                                        363/15
6,975,193 B2    12/2005   Knieser et al.
(Continued)

FOREIGN PATENT DOCUMENTS

EP           2330384 B1     3/2019
GB          2474261 A      4/2011

OTHER PUBLICATIONS

Great Britain combined search and examination report issued in connection with corresponding GB patent application No. 1711053.7 dated Jan. 11, 2018.
(Continued)

*Primary Examiner* — Rexford N Barnie
*Assistant Examiner* — Joseph N Inge
(74) *Attorney, Agent, or Firm* — McGarry Bair PC

(57) ABSTRACT

A power distribution switch including a micro electro mechanical system (MEMS) relay switch matrix disposed between a power source and an electrical load, and a controller module configured to operate the MEMS relay switch between a conducting and a non-conducting state, wherein the conducting state conducts power from the power source to the electrical load and the non-conducting state prevents power conduction from the power sources to the electrical load.

15 Claims, 4 Drawing Sheets

(51) Int. Cl.
  *H02J 4/00* (2006.01)
  *H01H 1/00* (2006.01)
  *B64D 41/00* (2006.01)
  *H01H 59/00* (2006.01)
  *H02J 3/38* (2006.01)

(52) U.S. Cl.
  CPC ....... *B64D 2221/00* (2013.01); *H01H 1/0036* (2013.01); *H01H 59/0009* (2013.01); *H02J 3/383* (2013.01)

(58) Field of Classification Search
  CPC ..... H01H 69/00; H01H 2203/00; H02J 3/005; H02J 3/00; H02J 1/00; H02J 4/00; H03H 1/00; H01L 21/00; B64D 1/00; B64D 2221/00
  USPC .......................................................... 307/24
  See application file for complete search history.

(56) References Cited

U.S. PATENT DOCUMENTS

| | | | |
|---|---|---|---|
| 7,332,835 B1 | 2/2008 | Wright et al. | |
| 7,554,222 B2 | 6/2009 | Kumfer et al. | |
| 7,624,289 B2 | 11/2009 | Cranford, Jr. et al. | |
| 7,643,256 B2 | 1/2010 | Wright et al. | |
| 7,928,333 B2 | 4/2011 | Wang et al. | |
| 8,054,589 B2 | 11/2011 | Gowda et al. | |
| 8,144,445 B2 | 3/2012 | Caggiano et al. | |
| 8,354,899 B2 | 1/2013 | Keimel et al. | |
| 8,358,488 B2 | 1/2013 | Premerlani et al. | |
| 8,537,507 B2 | 10/2013 | Kumfer et al. | |
| 8,570,713 B2 | 10/2013 | Kumfer et al. | |
| 8,638,093 B2 | 1/2014 | Aimi et al. | |
| 8,826,529 B2 | 9/2014 | Detor et al. | |
| 9,252,680 B2* | 2/2016 | Huang | H02J 3/383 |
| 2006/0232907 A1* | 10/2006 | Huber | F25D 21/008 361/160 |
| 2007/0139830 A1* | 6/2007 | Premerlani | H01H 9/54 361/2 |
| 2008/0137238 A1* | 6/2008 | Wright | H01H 9/541 361/2 |
| 2008/0164961 A1* | 7/2008 | Premerlani | H01H 1/0036 335/7 |
| 2008/0309438 A1 | 12/2008 | Caggiano et al. | |
| 2008/0316664 A1* | 12/2008 | Premerlani | H01H 59/0009 361/87 |
| 2009/0115255 A1 | 5/2009 | Kumfer et al. | |
| 2009/0121549 A1* | 5/2009 | Leonard | H02M 3/156 307/51 |
| 2010/0246223 A1* | 9/2010 | Xuan | H02J 3/381 363/95 |
| 2011/0127853 A1* | 6/2011 | Fujita | G01D 4/004 307/131 |
| 2013/0003262 A1 | 1/2013 | Kumfer et al. | |
| 2013/0076144 A1 | 3/2013 | Agamy et al. | |
| 2016/0172862 A1* | 6/2016 | Nishigai | H02J 7/34 307/25 |
| 2019/0245457 A1* | 8/2019 | Telefus | G05F 1/66 |

OTHER PUBLICATIONS

Intellectual Property Office, Examination Report under Section 18(3) re Application No. GB1711053.7, dated Jan. 15, 2020, 3 pages, South Wales, NP.

* cited by examiner

POWER DISTRIBUTION SWITCH FOR A POWER DISTRIBUTION SYSTEM

BACKGROUND OF THE INVENTION

Electrical circuits can be configured having a switch for controlling an electrical operation, such as enabling or disabling an electrical load. For example, the switch can be controllable to toggle between a first mode of operation, wherein the switch is "closed" intending current to be transmitted from a switch input to a switch output, and a second mode of operation, wherein the switch is "open" intending current to be prevented from transmitting between the switch input and switch output.

Electrical power systems, such as those found in an aircraft power distribution system, employ power generating systems or power sources, such as generators, for generating electricity for powering electrical loads, e.g., in the systems and subsystems of an aircraft. As the electricity traverses electrical bus bars and wiring to deliver power from power sources to electrical loads, power distribution nodes dispersed throughout the power system ensure that the power delivered to the electrical loads meets the designed power criteria for the loads. Power distribution nodes can, for instance, further provide switching operations to selectively enable or disable the delivery of power to particular electrical loads, depending on, for example, available power distribution supply, criticality of electrical load functionality, or aircraft mode of operation, such as take-off, cruise, or ground operations.

BRIEF DESCRIPTION OF THE INVENTION

In one aspect, the present disclosure relates to a power distribution switch, including a micro electro mechanical system (MEMS) relay switch disposed between a regulated power source and an electrical load, and a controller module configured to operate the MEMS relay switch between a conducting and a non-conducting state.

In another aspect, the present disclosure relates to a power distribution system, including a set of regulated power sources, a set of electrical loads, a set of micro electro mechanical system (MEMS) relay switches disposed between the set of regulated power sources and the set of electrical loads, and a controller module configured to operate the MEMS relay switch between a conducting and a non-conducting state.

In yet another aspect, the present disclosure relates to a method for operating a power distribution system, including determining, in a controller module, a desired switch state for a micro electro mechanical system (MEMS) relay switch, obtaining, by the controller module, a regulated power characteristic representative of a regulated power supply, and controllably operating, by the controller module, the MEMS relay switch in accordance with the desired switch state when the received regulated power characteristic satisfies a power characteristic threshold value. The power characteristic threshold value is selected to reduce electrical stress on the MEMS relay switch.

DESCRIPTION OF EMBODIMENTS OF THE INVENTION

Figure 1:
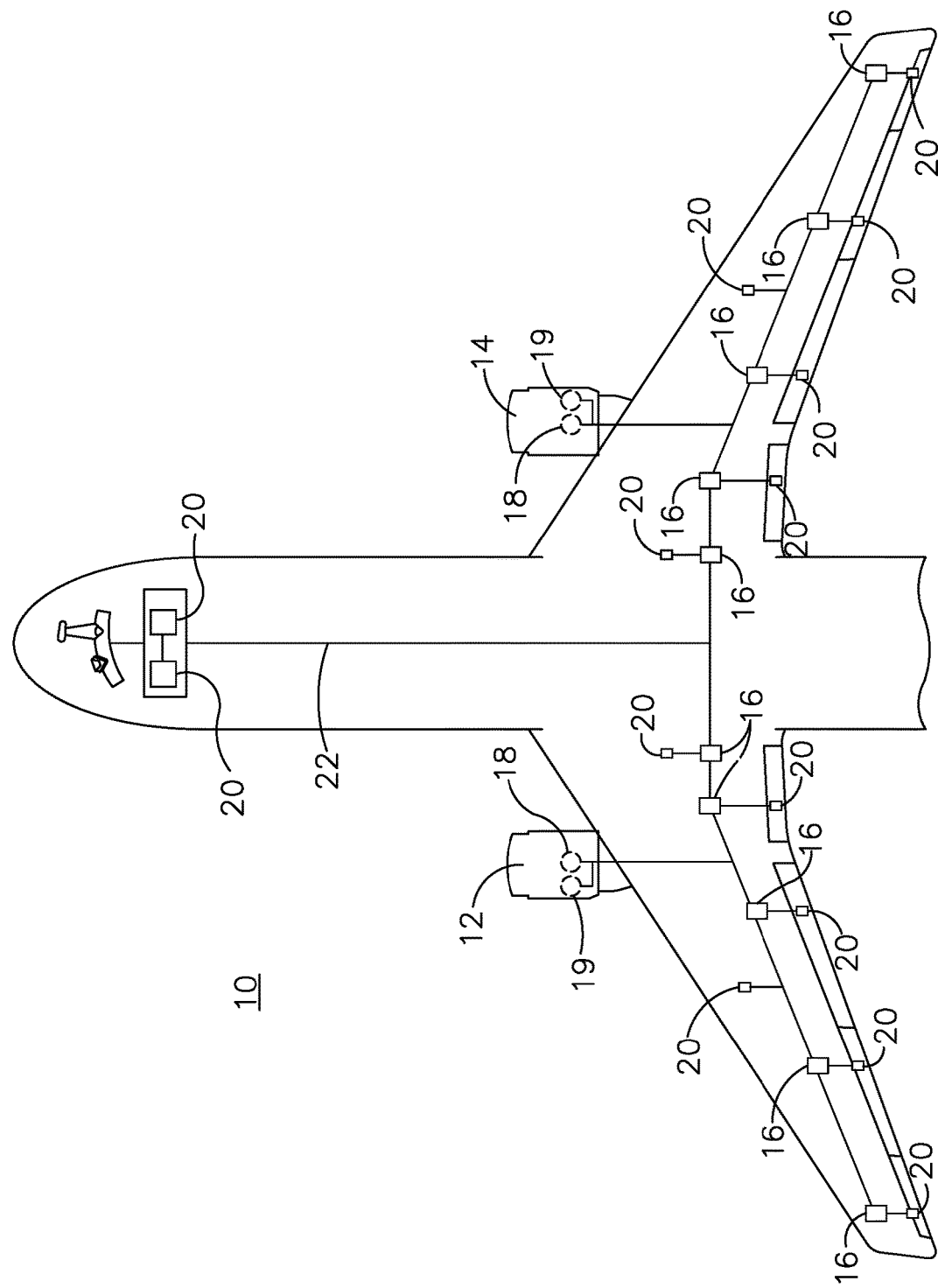
FIG. 1 is a top down schematic view of the aircraft and power distribution system of an aircraft, in accordance with various aspects described herein.

As used herein, a controllable switching element, or a "switch" is an electrical device that can be controllable to toggle between a first mode of operation, wherein the switch is "closed" or "on" intending to transmit current from a switch input to a switch output, and a second mode of operation, wherein the switch is "open" or "off" intending to prevent current from transmitting between the switch input and switch output. In non-limiting examples, connections or disconnections, such as connections enabled or disabled by the controllable switching element, can be selectively configured to provide, enable, disable, or the like, an electrical connection between respective elements.

Aspects of the disclosure can be implemented in any electrical circuit environment having a switch. A non-limiting example of an electrical circuit environment that can include aspects of the disclosure can include an aircraft power system architecture, which enables production of electrical power from at least one spool of a turbine engine, preferably a gas turbine engine, and delivers the electrical power to a set of electrical loads via at least one solid state switch, such as a solid state power controller (SSPC) switching device.

One non-limiting example of a controllable switching element or switch can include a micro electro mechanical system (MEMS) relay switch. As used herein, a MEMS relay switch can be defined by way of a set of physical dimensions, including but not limited to micron-sized contacts. Additionally MEMS relay switch can comprise materials capable of sustaining (e.g. blocking or "holding off") high voltages (e.g. on the order of a few hundred volts) while in the off state, high current densities (e.g. 100-200 milliamps) in the on state. Non-limiting aspects of the MEMS relay switch can further include or incorporate electronics (e.g. integrated electronics) to allow for temporary or momentary switch energy to bypass the switch during switching events (e.g. on-to-off, or off-to-on switching operations) to allow, enable, or provide for the MEMS relay switch to change state without electrical breakdown. Non-limiting examples of MEMS relay switches, and construction, configuration, or forming thereof can be found in U.S. Pat. Nos. 8,354,899, 8,826,529, 8,638,093, 7,332,835, 7,643,256, 8,144,445, 7,554,222, 8,358,488, 7,928,333, 8,054,589, 8,570,713, 8,537,507, and U.S. patent publication US 2013/0025934, all incorporated herein in their entirety.

Additionally, while terms such as "voltage", "current", and "power" can be used herein, it will be evident to one skilled in the art that these terms can be interchangeable when describing aspects of the electrical circuit, or circuit operations. Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein.

While "a set of" various elements will be described, it will be understood that "a set" can include any number of the respective elements, including only one element. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

As illustrated in FIG. 1, an aircraft 10 can include a power distribution system shown having at least one gas turbine engine, shown as a left engine system 12 and a right engine system 14. Alternatively, the power system can have fewer or additional engine systems. The left and right engine systems 12, 14 can be substantially identical, and can further include at least one power source, such as an electric machine or a generator 18. The aircraft is shown further having a set of power-consuming components, or electrical loads 20, such as for instance, an actuator load, flight critical loads, and non-flight critical loads. The electrical loads 20 are electrically coupled with at least one of the generators 18 via a power distribution system including, for instance, power transmission lines 22 or bus bars, and power distribution nodes 16. It will be understood that the illustrated aspects of the disclosure of FIG. 1 is only one non-limiting example of a power distribution system, and many other possible aspects of the disclosure and configurations in addition to that shown are contemplated by the present disclosure. Furthermore, the number of, and placement of, the various components depicted in FIG. 1 are also non-limiting examples of aspects associated with the disclosure.

In the aircraft 10, the operating left and right engine systems 12, 14 provide mechanical energy which can be extracted, typically via a spool, to provide a driving force for the generator 18. The generator 18, in turn, generates power, such as AC or DC power, and provides the generated power to the transmission lines 22, which delivers the power to the power distribution nodes 16, positioned throughout the aircraft 10. The power distribution nodes 16 receive the AC or DC power via the transmission lines 22, and can provide switching, power conversion, or distribution management functions, as needed, in order to provide the desired electrical power to the electrical loads 20 for load operations.

Example power distribution management functions can include, but are not limited to, selectively enabling or disabling the delivery of power to particular electrical loads 20, depending on, for example, available power distribution supply, criticality of electrical load 20 functionality, the state of health of the electrical system or loads, or aircraft mode of operation, such as take-off, cruise, or ground operations. Additional management functions can be included. Furthermore, additional power sources for providing power to the electrical loads 20, such as emergency power sources, ram air turbine systems, starter/generators, or batteries, can be included, and can substitute for the power source. It will be understood that while aspects of the disclosure are shown in an aircraft environment, the disclosure is not so limited and has general application to electrical power systems in non-aircraft applications, such as other mobile applications and non-mobile industrial, commercial, and residential applications.

Figure 2:
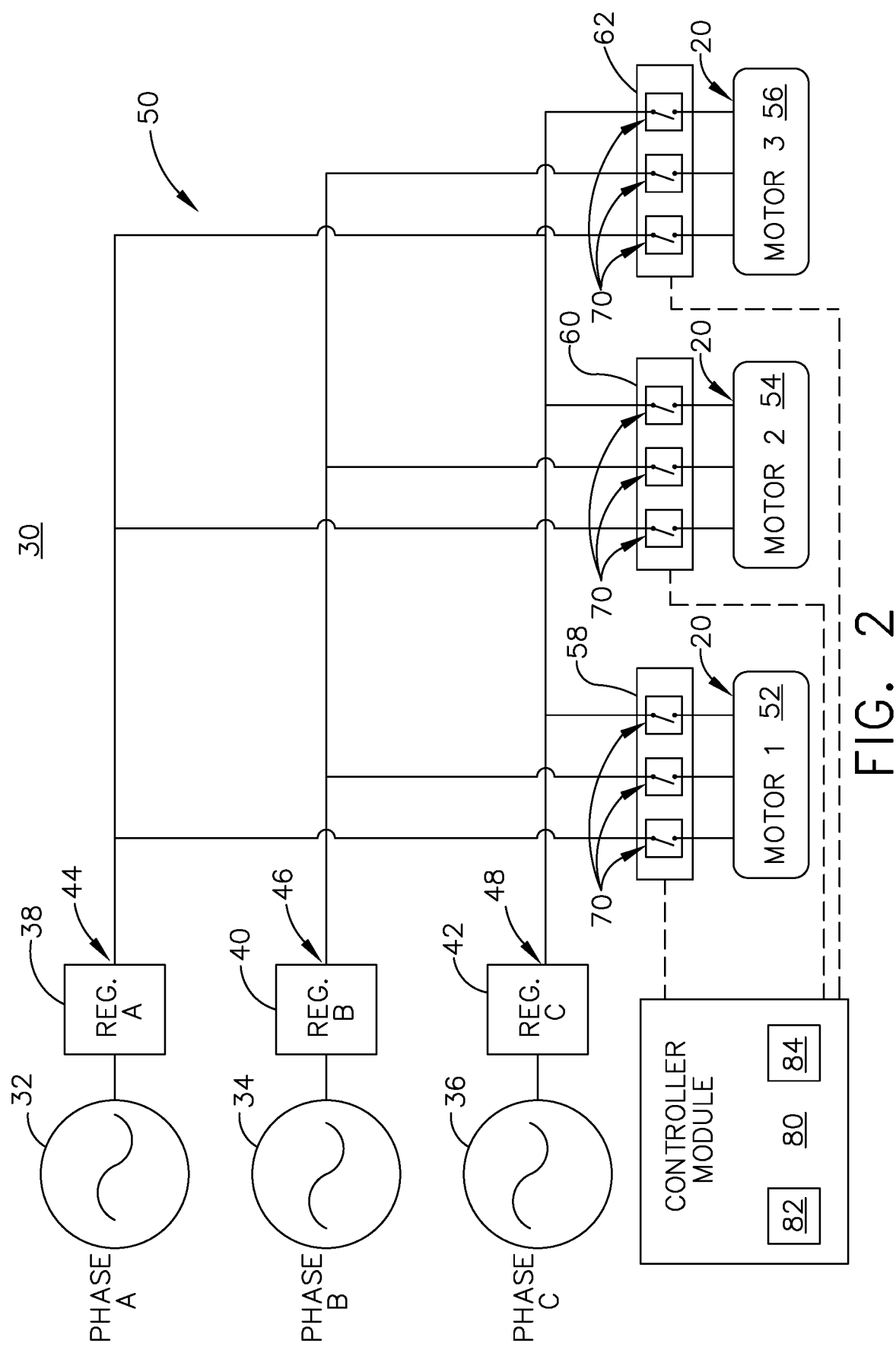
FIG. 2 is a schematic view of a power distribution system and controllable switching element of FIG. 1, in accordance with various aspects described herein.

The operation of a power distribution system 30, is explained with reference to FIG. 2. The power distribution system 30 is similar to the power distribution system or power distribution node 16 of FIG. 1. The power distribution system 30 can be connected to a power supply, including, but not limited to, the generator 18. In the non-limiting illustrated example, the power distribution system 30 can be connected with a set of power supplies, including but not limited to, a first power supply 32, a second power supply 34, and a third power supply 36. In one non-limiting aspect of the disclosure, the set of power supplies 32, 34, 36 can include respective phases (A, B, and C) in a three-phase alternating current (AC) power distribution system 30. While three phases via three power supplies 32, 34, 36 are shown, any number of phases or power supplies (for example, including direct current (DC) power), or neutral phase lines), can be included. Additionally, non-generator power sources can be included in non-limiting aspects of the disclosure, including, but not limited to, auxiliary power sources, solar power systems, batteries, capacitors, another renewable or alternative power source, or the like. In yet another, the power sources can include dynamic or variable power sources, wherein the power supplied by the power source can vary with operating conditions, over a period of time, or the like.

Each respective power supply 32, 34, 36 can be connected with a power regulator, shown as a first power regulator ("Reg. A") 38 having a first power output 44, a second power regulator ("Reg. B") 40 having a second power output 46, and a third power regulator ("Reg. C") 42 having a third power output 48. Each of the respective power regulators 38, 40, 42 can be selected, configured, or enabled to operably regulate the power generated by the power supply 32, 34, 36 to the respective regulated power output 44, 46, 48. As used herein, "regulating" the power supply can include converting a variable power source or supply to a non-variable power output, including but not limited to, a pure sine wave alternating current (e.g. 115 Volts AC at 400 Hz), a permanent magnet electrical machine, a wound field electric machine, or the like. Non-limiting aspects of the power supply 32, 34, 36 can include additional power sources, such as, but not limited to, DC power sources, an AC or DC power bus, a set of 3-phase AC sources, or the like.

Non-limiting aspects of the disclosure can be included wherein at least a subset of the power regulators 38, 40, 42 can include active power regulators. As used herein, an "active" power regulator can include power regulators having switched-mode type converters that are enabled or configured to provide at least one of adjustable duty-cycles or frequency alteration to regulate the output of the power regulator.

The set of regulated power outputs 44, 46, 48 can be provided to a set of transmission lines, shown as a transmission line matrix 50, enabling or allowing at least a subset of the regulated power outputs 44, 46, 48 to be connected with a set of electrical loads 20. In one non-limiting aspect, the set of electrical loads 20 can include a set of electric motors, shown as a first motor ("Motor 1") 52, a second motor ("Motor 2") 54, and a third motor ("Motor 3") 56. Each respective electrical load 20 can be selectively connected with the transmission line matrix 50 by way of a respective controllable switching element, shown as a first controllable switching element 58 selectively connecting the first motor 52 with the transmission line matrix 50, a second controllable switching element 60 selectively connecting the second motor 54 with the transmission line matrix 50, and a third controllable switching element 62 selectively connecting the third motor 56 with the transmission line matrix 50. At least a subset of the controllable switching elements 58, 60, 62 can further include a set of MEMS relays 70, selectably connecting at least a subset of the individual power supplies 32, 34, 36 or individual regulated power outputs 44, 46, 48 with the electrical load 20.

The set of controllable switching elements 58, 60, 62, the set of MEMS relays 70, or a combination thereof, can be communicatively connected with a controller module 80 having a processor 82 and memory 84. In this sense, the controller module 80 or the processor 82 can be configured to operate or execute a set of instructions for controllably switching at least one MEMS relay 70, at least one controllable switching element 58, 60, 62, or a combination thereof, to selectively enable or disable the supplying of power (e.g. energizing or de-energizing) from at least one of the set of regulated power outputs 44, 46, 48 to at least one of the set of electrical loads 20. The controller module 80 can further determine, produce, generate, provide, or the like, an output signal, including but not limited to, a switch controller module output signal or a communication signal, as described herein. In another sense, at least one MEMS relay 70, at least one controllable switching element 58, 60, 62, or a combination thereof, can operate in response to a control signal received from the controller module 80 or processor 82.

While the controller module 80 is not illustrated communicatively connected with the set of power regulators 38, 40, 42, non-limiting aspects of the disclosure can be included wherein the controller module 80 is communicatively connected with at least a subset of the power regulators 38, 40, 42. In this sense, a subset of the power regulators 38, 40, 42 can, for example, operate in response to control signals provided by the controller module 80 or processor 82, or can provide regulated power output data or information to the controller module 80 or processor 82. In one non-limiting aspect, the subset of power regulators 38, 40, 42 can provide current values, voltage values, zero-crossing timing values, or the like, to the controller module 80. In yet further non-limiting aspects of the disclosure, the subset of the power regulators 38, 40, 42 can operate in response to control signals provided to the controllable switching elements 58, 60, 62, vice versa, or a combination thereof.

While the controller module 80 is illustrated as separate and apart from the power distribution system 30, aspects of the disclosure can be included wherein, for instance, the controller module 80 is included with the power distribution system 30, or a component thereof.

During operation of the power distribution system 30, the controller module 80 or processor 82 can enable or operate the switching functionality of the set of controllable switching elements 58, 60, 62, the set of MEMS relays 70, or a combination thereof, by way of a communicated control signal. In the example wherein the electrical load is a motor 52, 54, 56, or another load 20 operably using multiple power sources or power phases, the controller module 80 or the processor 82 can enable or operate the switching functionality of the set of controllable switching elements 58, 60, 62, the set of MEMS relays 70, or a combination thereof, to provide for a timed supplying of respective regulated power outputs 44, 46, 48 as desired for proper motor 52, 54, 56 operation. For instance, in one non-limiting example of a motor 52, 54, 56 starting procedure, the switching operations of the set of controllable switching elements 58, 60, 62, the set of MEMS relays 70, or a combination thereof can operably provide the respective phase power output 44, 46, 48 during a desired waveform (e.g. during the positive half-wave of the power output phase) to step the motor 52, 54, 56 toward synchronous operation. In another non-limiting example, the controller module 80 can further ensure the timing aspects with the waveform, or another timing-based power characteristic, by way of receiving a communication related to a sensed or measured value from the respective power regulator 38, 40, 42.

In one non-limiting example of the power distribution system 30, a set of DC power sources or a DC power bus can supply power by way of the transmission line matrix 50 to a set of individual motor drives, via the set of controllable switching elements 58, 60, 62, the set of MEMS relays 70, or a combination thereof.

Figure 3:
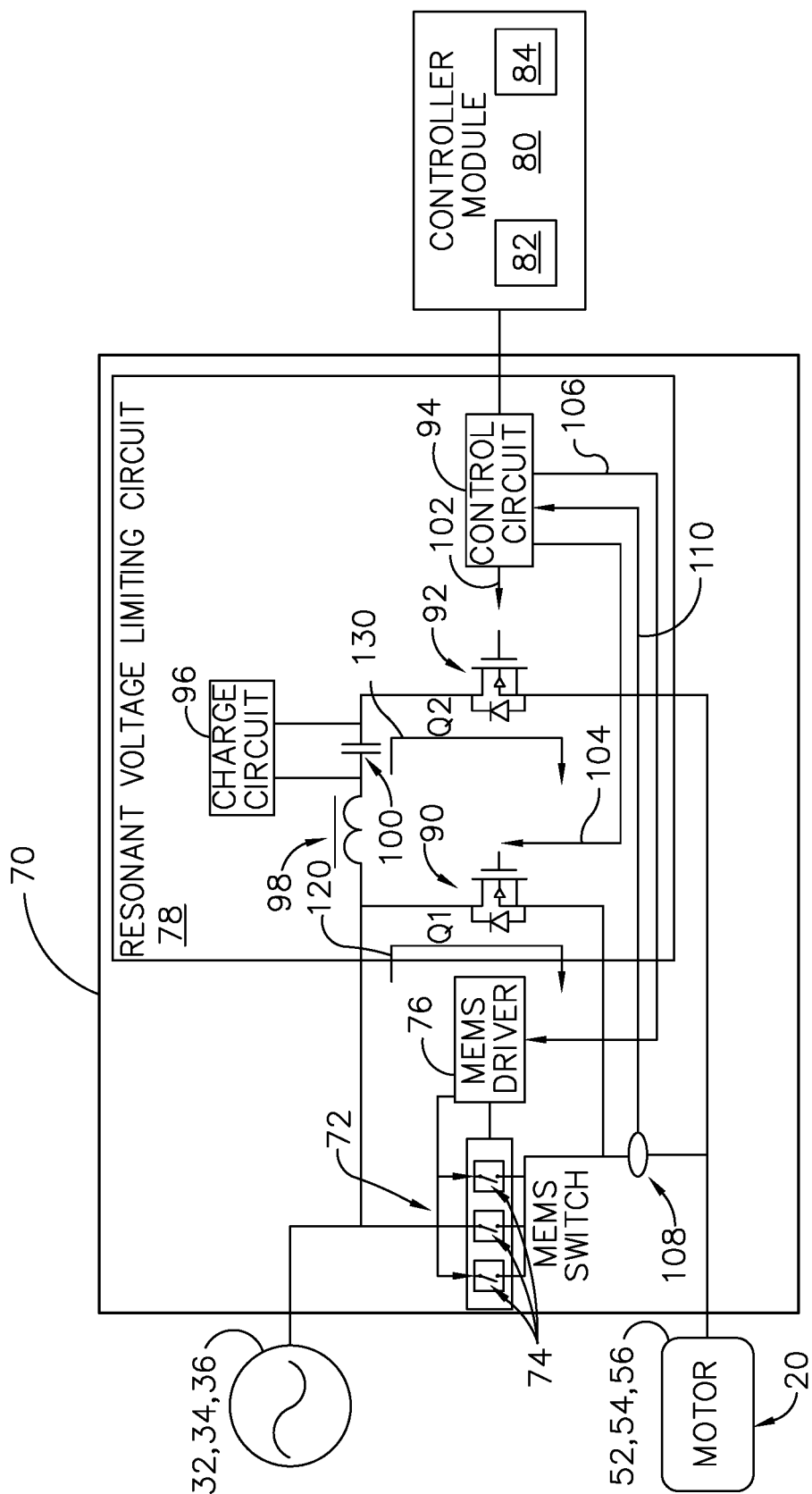
FIG. 3 is a schematic view of the controllable switching element of FIG. 2, in accordance with various aspects described herein.

FIG. 3 illustrates additional non-limiting characteristics of the MEMS relay 70. As shown, the MEMS relay 70 can include a set or array 72 of individual MEMS relay switches 74 arranged in electrical parallel between the power supply 32, 34, 36 and the electrical load 20. In the illustrated example, three MEMS relay switches 74 are shown in parallel, but any number of MEMS relay switches 74 can be included. The array 72 of MEMS relay switches 74 can be controllably operated by a MEMS driver 76 configured to control the electro mechanical operation of the switches 74, in response to the control signal. In one non-limiting example, while an individual MEMS relay switch can be capable, configured, or enabled to pass between 100-200 milliamps of current when closed, the array 72 of MEMS relay switches 74 can collectively pass between 10 and 20 Amps when closed. Non-limiting aspects of the disclosure can be included wherein the array 72 of MEMS relay switches 74 operate in response to a common control signal (e.g. they are not independently operable).

The MEMS relay 70 can further include a resonant voltage limiting circuit 78 allowing or enabling additional optional control and protection capabilities for the MEMS relay 70. For example, the resonant voltage limiting circuit 78 can include a first solid state switch 90, shown as transistor Q1, and a second solid state switch 92, shown as transistor Q2, electrically in parallel with the array 72 of MEMS relay switches 74. Non-limiting aspects of the resonant voltage limiting circuit 78 can further include an inductance 98 and capacitance 100 in series with the second solid state switch 92, and a charge circuit 96 disposed across the capacitance 100.

Further non-limiting aspects of the resonant voltage limiting circuit 78 can include a control circuit 94 communicatively connected with the controller module 80. The control circuit 94 can be communicatively connected with the MEMS driver 76, the first solid state switch 90, and the second solid state switch 92. The control circuit 94 can also be communicatively connected with a current sensor 108 positioned downstream of the parallel arrangement of the array 72 of MEMS relay switches 74 and the first solid state switch 90, but outside of the of the second solid state switch 92 parallel current path. In this arrangement, the control circuit 94 can operably or effectively receive a measured or sensed current value signal 110 from the current sensor 108 and a control signal from the controller module 80. Additionally, the control circuit 94 can operably or effectively generate and provide a first control signal 106 to the MEMS driver 76, a second control signal 104 to the first solid state switch 90, and a third control signal 102 to the second solid state switch 92.

In response to the received control signal from the controller module 80 and the measured or sensed current value signal 110, the control circuit 94 can operate the array of MEMS relay switches 74 (via the first control signal 106 and the MEMS driver 76) to supply power from the power source 32, 34, 36 to the electrical load 20, or alternatively or additionally, reroute a current supply through at least one of the first solid state switch 90 (via the second control signal 104 and current path 120) or the second solid state switch 92 (via the third control signal 102 and current path 130).

In one non-limiting example, the second control signal 104 can enable the current path 120 via Q1 prior to the array of MEMS relay switches 74 being closed. In this sense, load current will flow through the current path 120. Next, the third control signal 102 can enable the current path 130 via Q2 such that current will traverse an inductance 98 and effectively reduce the current through Q1. When the current through current look 120 is zero, or proximate to zero, as measured by current sensor 108, the array of MEMS relay switches 74 can be closed, as instructed and timed via the first control signal 106. Likewise, in another non-limiting example, the second control signal 104 can enable the current path 120 via Q1 prior to the array of MEMS relay switches 74 being opened. Next, the third control signal 102 can enable the current path 130 via Q2 and the inductance 98 such that the current path 130 will effectively reduce the current across the array of MEMS relay switches 74. When the MEMS current, as measured by current sensor 108, is zero or proximate to zero, the array of MEMS relay switches 74 can be opened. As used herein, a "regulated" power source, or a "regulated" output can include regulation performed or enabled by way of the control circuit 94, the resonant voltage limiting circuit 78, or the like.

By utilizing the selective switching operations of the MEMS relay switches, a power distribution system can employ power distribution from a set of power sources to a set of electrical loads in any permutation of selective switching operations. For instance, in one non-limiting aspect, all sources can be selectively connected to all loads. In another non-limiting aspect a subset of sources can be selectively connected to a subset of loads, for instance, based on a selective timing pattern or execution of instruction set. Many other possible aspects and configurations in addition to that shown in the above figures are contemplated by the present disclosure. For example, MEMS-based devices can further be implemented using a simplified version of the HALT technology described in U.S. Pat. No. 8,358,488. Additionally, the design and placement of the various components can be rearranged such that a number of different in-line configurations could be realized.

Figure 4:
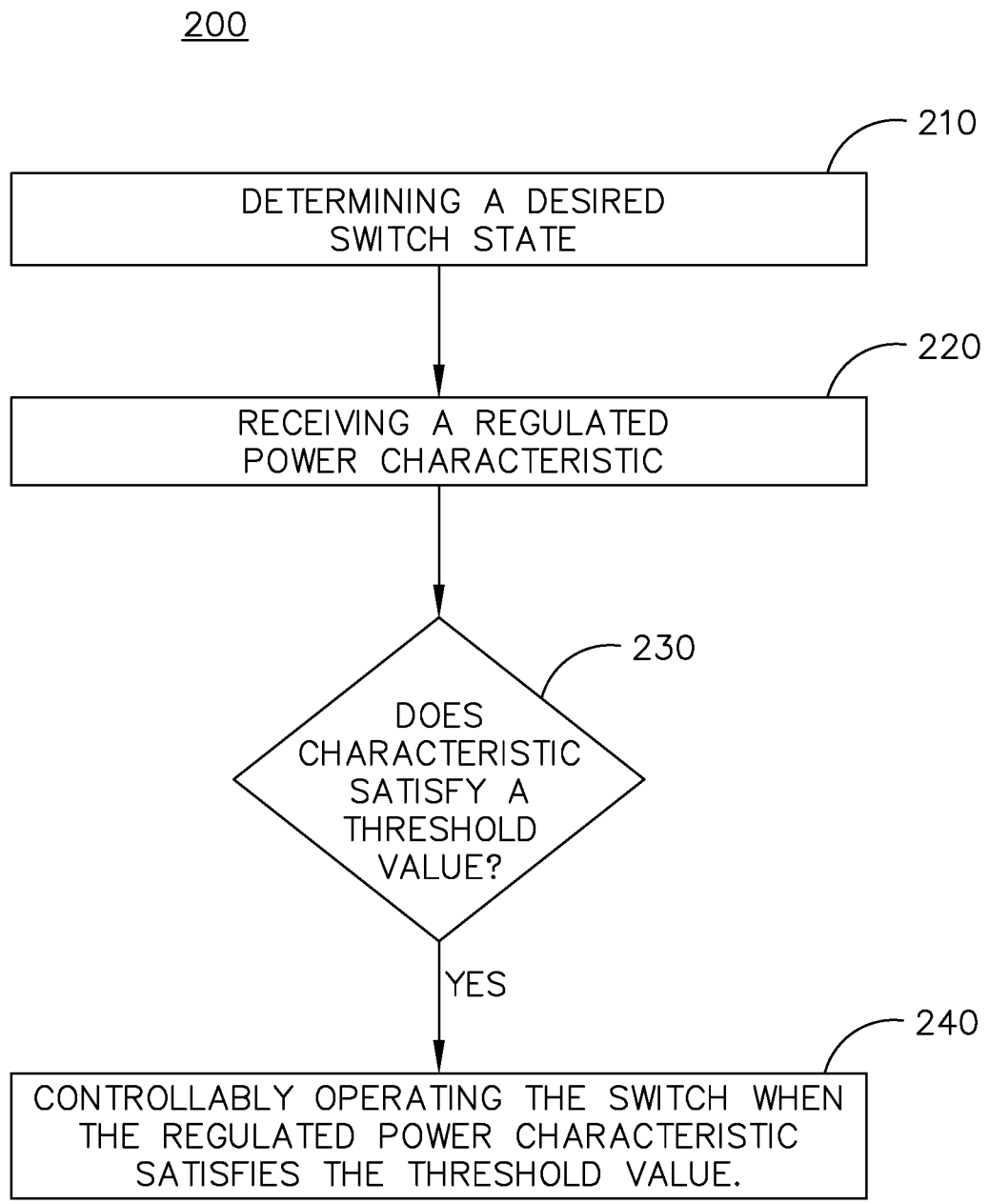
FIG. 4 is an example a flow chart diagram of demonstrating a method for operating the power distribution system, in accordance with various aspects described herein.

FIG. 4 is an example a flow chart diagram of demonstrating a method for operating the power distribution system 30. The method 300 begins by determining, in a controller module 80, 94, a desired switch state for the array of MEMS relay switches 74, at 210. Next, the method 200 includes obtaining, by the controller module 80, 94, a regulated power characteristic representative of a regulated power supply, at 220. In one non-limiting example, the power characteristic can include a current value, such as sensed by the current sensor 108, or a value provided to the controller module 80 by at least one of the set of power supplies 32, 34, 36 or the set of power regulators 38, 40, 42. The method 200 continues by determining whether the received regulated power characteristic satisfies a power characteristic threshold value, at 230. The method 200 then continues to controllably operating, by the controller module 80, 94, the array of MEMS relay switches 74 in accordance with the desired switch state when the received regulated power characteristic satisfies a power characteristic threshold value, at 240. In one non-limiting aspect of the disclosure, the power characteristic threshold value can include a zero-crossing current, or near zero-crossing current or current value of the power supply 32, 34, 36, as sensed or anticipated by the controller module 80, 94. In this sense, the timing of operation of the switching operations can correspond with the zero-crossing (or proximate thereto) to reduce electrical stress on the array of MEMS relay switches 74. As used herein, "electrical stress" on the array of MEMS relay switches 74 can include, but is not limited to, inrush currents, fault currents, rupture currents, or the like, or any other temporal electrical events due to the switching on or off of the array of MEMS relay switches 74.

The sequence depicted is for illustrative purposes only and is not meant to limit the method 300 in any way as it is understood that the portions of the method can proceed in a different logical order, additional or intervening portions can be included, or described portions of the method can be divided into multiple portions, or described portions of the method can be omitted without detracting from the described method.

The aspects disclosed herein provide a method and power distribution system for selectively supplying power to a set of electrical loads. The technical effect is that the above described aspects enable the supplying of electrical power in response to sensed or measured values, or in response to the execution of a set of instructions. One advantage that can be realized in the above-described aspects is that the above described aspects provide for the utilization of MEMS relay switches in the implementation of the power distribution system. The MEMS relay switches achieve a mass, volume, and energy dissipation lower than conventional power distribution systems using conventional contactors or solid state switches. For example, MEMS-based switches can utilize passive cooling due to lower power dissipation, compared with solid state switches or conventional switching configurations. In another non-limiting aspect of the disclosure, MEMS relay switches can inherently conduct current bi-directionally, compared with solid state switching. In yet another advantage, MEMS relay switches provide superior immunity to vibration effects due to lower mass.

By further utilizing regulated sources of power, for example via the set of power regulators, or via the resonant voltage limiting circuit, variable sources of power can be included in the power distribution system. Another non-limiting advantage to including power regulators is the ability to enable or allow for zero-current switching operations, removing the barrier to rupturing large fault currents.

Yet another non-limiting advantage of the above-described aspects includes the small physical volume and footprint of the MEMS-based devices. The small volume and footprint are further enabled by MEMS-based devices not requiring ancillary electronics for the management of high currents, making it beneficial in the implementation of the switching matrix described herein. In yet another advantage, an array of MEMS relay switches can provide redundancy in the event of a failure of a subset of the switches.

Yet another non-limiting advantage of the above-described aspects enables the greater flexibility in dynamically allowing or enabling electrical load or power supply balancing for the power distribution system due to the matrix and switching configuration.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. All combinations or permutations of features described herein are covered by this disclosure.

This written description uses examples to disclose aspects of the disclosure, including the best mode, and also to enable any person skilled in the art to practice the aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power distribution switch, comprising:
a controller module communicatively coupled to a power source having a power regulator, and arranged to receive an indication of a zero-crossing of an output current of the power source from the power regulator, and in response to the indication, to provide a first control signal; and
a micro electro mechanical system (MEMS) relay comprising a MEMS switch controllably operated by a MEMS driver, the MEMS switch disposed between the power source and an electrical load, the MEMS relay further comprising a resonant voltage limiting circuit, the resonant voltage limiting circuit including a control circuit in signal communication with the controller module and responsive to the first control signal to provide a second control signal to the MEMS driver to operate the MEMS switch between a conducting and a non-conducting state, the resonant voltage limiting circuit further including a first solid state switch and a second solid state switch electrically in parallel with the MEMS switch, and an inductance and capacitance in series with the second solid state switch, and a charge circuit disposed across the capacitance.

2. The power distribution switch of claim 1 wherein the power source is a variable power source.

3. The power distribution switch of claim 1 wherein the power source is a set of power sources.

4. The power distribution switch of claim 1, wherein the control circuit is configured to receive a third signal indicative of a current flow from a current sensor disposed downstream from the MEMS switch, and wherein the control circuit is further configured to provide the second control signal responsive to at least one of the first control signal from the control module and the third signal from the current sensor.

5. The power distribution switch of claim 4, wherein the resonant voltage limiting circuit is further responsive to the at least one of the first control signal from the control module and the third signal from the current sensor to selectively provide a fourth control signal to the first solid state switch, and a fifth control signal to the second solid state switch.

6. The power distribution switch of claim 5, wherein the control circuit is configured to reroute a current through at least one of the first solid state switch based on the second control signal and the second solid state switch based on the fifth control signal.

7. A power distribution system, comprising:
a set of regulated power sources;
a set of electrical loads;
a controller module communicatively coupled to the set of power sources, and arranged to receive an indication of a zero-crossing of an output current of the set of regulated power source from a regulator of the set of regulated power sources, and in response to the indication, provide a first control signal; and
a set of micro electro mechanical system (MEMS) relays disposed between the set of regulated power sources and the set of electrical loads, each relay comprising a respective MEMS switch controllably operated by a MEMS driver, each MEMS relay further comprising a resonant voltage limiting circuit, the resonant voltage limiting circuit including a control circuit in signal communication with the controller module and responsive to the first control signal to provide a second control signal to the MEMS driver to operate the MEMS switch between a conducting and a non-conducting state, the resonant voltage limiting circuit further including a first solid state switch and a second solid state switch electrically in parallel with the MEMS switch, and an inductance and capacitance in series with the second solid state switch, and a charge circuit disposed across the capacitance.

8. The power distribution system of claim 7 wherein the set of regulated power source includes an unregulated power source and a power regulator, wherein the power regulator provides the regulated power source.

9. The power distribution system of claim 8 wherein the unregulated power source is a variable power source.

10. The power distribution system of claim 9 wherein the unregulated power source is a solar power system.

11. The power distribution system of claim 7 wherein the set of regulated power sources includes at least one of a pure sine wave alternating current (AC) source.

12. The power distribution system of claim 7 wherein the set of power sources includes at least one regulated power source and at least one variable power source connected with a power regulator.

13. The power distribution system of claim 7, further comprising a transmission line matrix conductively connecting the set of regulated power sources with the set of MEMS relay switches.

14. The power distribution system of claim 13 wherein the set of regulated power sources includes at least power sources supplying two phases of AC power.

15. A method for operating a power distribution system, comprising:
determining, in a controller module, a desired switch state for a micro electro mechanical system (MEMS) relay comprising a MEMS switch controllably operated by a MEMS driver, the MEMS switch disposed between a regulated power source and an electrical load, the MEMS relay comprising a resonant voltage limiting circuit, the resonant voltage limiting circuit including a control circuit, the control circuit being in signal communication with the controller module, the resonant voltage limiting circuit further including a first solid state switch and a second solid state switch electrically in parallel with the MEMS switch, and an inductance and capacitance in series with the second solid state switch, and a charge circuit disposed across the capacitance;

obtaining, by the controller module, from a regulator of the regulated power source, an indication of a zero-crossing of a current of the regulated power source;

providing a first control signal, by the controller module, to the control circuit of the resonant voltage limiting circuit, the control circuit being responsive to the first control signal; and providing a second control signal, by the control circuit, to the MEMS driver to operate the MEMS switch between a conducting and a non-conducting state;

wherein controllably operating the MEMS switch includes anticipating a zero-crossing of the current of the regulated power source, and controllably operating the MEMS switch based on the anticipated zero-crossing of the current.

* * * * *